US012098674B2

(12) United States Patent
Balbo et al.

(10) Patent No.: US 12,098,674 B2
(45) Date of Patent: Sep. 24, 2024

(54) OIL DELIVERY SYSTEM ARCHITECTURE

(71) Applicant: GE Avio S.r.l., Rivalta di Torino (IT)

(72) Inventors: Nicolò Balbo, Villafalletto (IT);
Miriam Manzoni, Rivalta di Torino (IT); Gianni Bardone, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/497,207

(22) Filed: Oct. 30, 2023

(65) Prior Publication Data
US 2024/0229716 A1     Jul. 11, 2024

(30) Foreign Application Priority Data

Jan. 11, 2023   (IT) .................. 102023000000213

(51) Int. Cl.
| | | |
|---|---|---|
| *F16H 57/04* | (2010.01) | |
| *F02C 7/06* | (2006.01) | |
| *F16N 7/40* | (2006.01) | |
| *F16N 25/00* | (2006.01) | |

(52) U.S. Cl.
CPC ............. *F02C 7/06* (2013.01); *F16N 7/40* (2013.01); *F16N 25/00* (2013.01); *F05D 2260/98* (2013.01); *F16N 2210/02* (2013.01); *F16N 2270/70* (2013.01); *F16N 2280/04* (2013.01)

(58) Field of Classification Search
CPC . F16H 57/04; F16N 7/40; F16N 25/00; F02C 7/06
See application file for complete search history.

(56) References Cited

U.S. PATENT DOCUMENTS

| 9,599,212 | B2 * | 3/2017 | Poster | F01M 1/18 |
| 9,732,840 | B2 * | 8/2017 | Harreau | F16N 29/00 |
| 9,765,875 | B2 * | 9/2017 | Sheridan | F16H 57/045 |
| 10,697,568 | B2 * | 6/2020 | Nakajima | B23K 1/18 |
| 10,746,284 | B2 * | 8/2020 | Gmirya | F16H 57/0435 |
| 11,009,116 | B2 * | 5/2021 | Olson | B64C 27/12 |
| 11,168,782 | B2 * | 11/2021 | Dziuba | F16N 13/22 |
| 11,313,455 | B2 * | 4/2022 | Mueller | F16H 57/0471 |

(Continued)

FOREIGN PATENT DOCUMENTS

| CN | 106461058 A | * | 2/2017 | ............ F01D 25/18 |
| CN | 109973800 A | * | 7/2019 | ............ F16N 27/02 |

(Continued)

*Primary Examiner* — Michael A Riegelman
(74) *Attorney, Agent, or Firm* — Venable LLP; Edward A. Kmett; Michele V. Frank

(57) ABSTRACT

An oil delivery system includes a first oil delivery circuit having a first oil distribution line delivering oil to at least one first circuit component part, a first oil pump, and a first switch valve, and a second oil delivery circuit having a second oil distribution line delivering oil to at least one second circuit component part, a second oil pump, and a second switch valve. The first switch valve controls a flow of oil through the first oil delivery circuit based on a difference between a first oil pressure of the first oil delivery circuit and a second oil pressure of the second oil delivery circuit. The second switch valve controls a flow of oil through the second oil delivery circuit based on a difference between the second oil pressure of the second oil delivery circuit and the first oil pressure of the first oil delivery circuit.

20 Claims, 5 Drawing Sheets

(56) References Cited

U.S. PATENT DOCUMENTS

| | | | |
|---|---|---|---|
| 11,352,905 B2* | 6/2022 | Bellis | F16H 57/0443 |
| 2005/0103286 A1* | 5/2005 | Ji | F16H 57/0434 |
| | | | 123/196 R |
| 2009/0045014 A1* | 2/2009 | Delaloye | F01D 25/20 |
| | | | 184/6.1 |
| 2010/0294597 A1* | 11/2010 | Parnin | F01D 25/18 |
| | | | 184/26 |
| 2015/0330252 A1* | 11/2015 | Manchikanti | F01D 25/162 |
| | | | 384/438 |
| 2017/0002738 A1* | 1/2017 | Sheridan | F16H 57/0486 |
| 2018/0051988 A1* | 2/2018 | Miocevich | F16N 19/00 |
| 2018/0106360 A1* | 4/2018 | Gmirya | F16H 57/0442 |
| 2019/0316488 A1* | 10/2019 | Menczykalski | F02C 7/06 |
| 2020/0392866 A1* | 12/2020 | Younes | F16C 19/52 |
| 2022/0127980 A1* | 4/2022 | Talen | F16N 7/385 |
| 2023/0072590 A1* | 3/2023 | Smith | F02C 7/06 |

FOREIGN PATENT DOCUMENTS

| | | | |
|---|---|---|---|
| EP | 3056790 A1 * | 8/2016 | F16N 7/40 |
| FR | 3127024 A1 | 3/2023 | |
| FR | 3127025 A1 | 3/2023 | |
| FR | 3129436 A1 | 5/2023 | |
| FR | 3129690 A1 | 6/2023 | |
| FR | 3130747 A1 | 6/2023 | |
| FR | 3130874 A1 | 6/2023 | |
| FR | 3130875 A1 | 6/2023 | |
| FR | 3130877 A1 | 6/2023 | |
| FR | 3130895 A1 | 6/2023 | |
| KR | 100534714 B1 | 12/2005 | |
| KR | 101621067 B1 | 5/2016 | |

\* cited by examiner

OIL DELIVERY SYSTEM ARCHITECTURE

CROSS REFERENCE TO RELATED APPLICATIONS

The present application claims the benefit of Italian Patent Application No. 102023000000213, filed on Jan. 11, 2023, which is hereby incorporated by reference herein in its entirety.

TECHNICAL FIELD

The present disclosure relates to an oil delivery system architecture.

BACKGROUND

Conventionally, aircraft engines include an oil delivery system that provides a flow of oil to various component parts of the aircraft engine. In a gas turbine engine, the oil delivery system may deliver oil to an accessory gearbox, to a main gearbox that drives a fan or propeller assembly, or may provide oil to bearings of a compressor section and to bearings of a turbine section. The oil delivery system may include an oil reservoir, a pump, a filter, and a heat exchanger, along with oil lines to provide a flow of oil from the oil reservoir to the main gearbox, and a return line to provide the flow of oil back to the oil reservoir.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
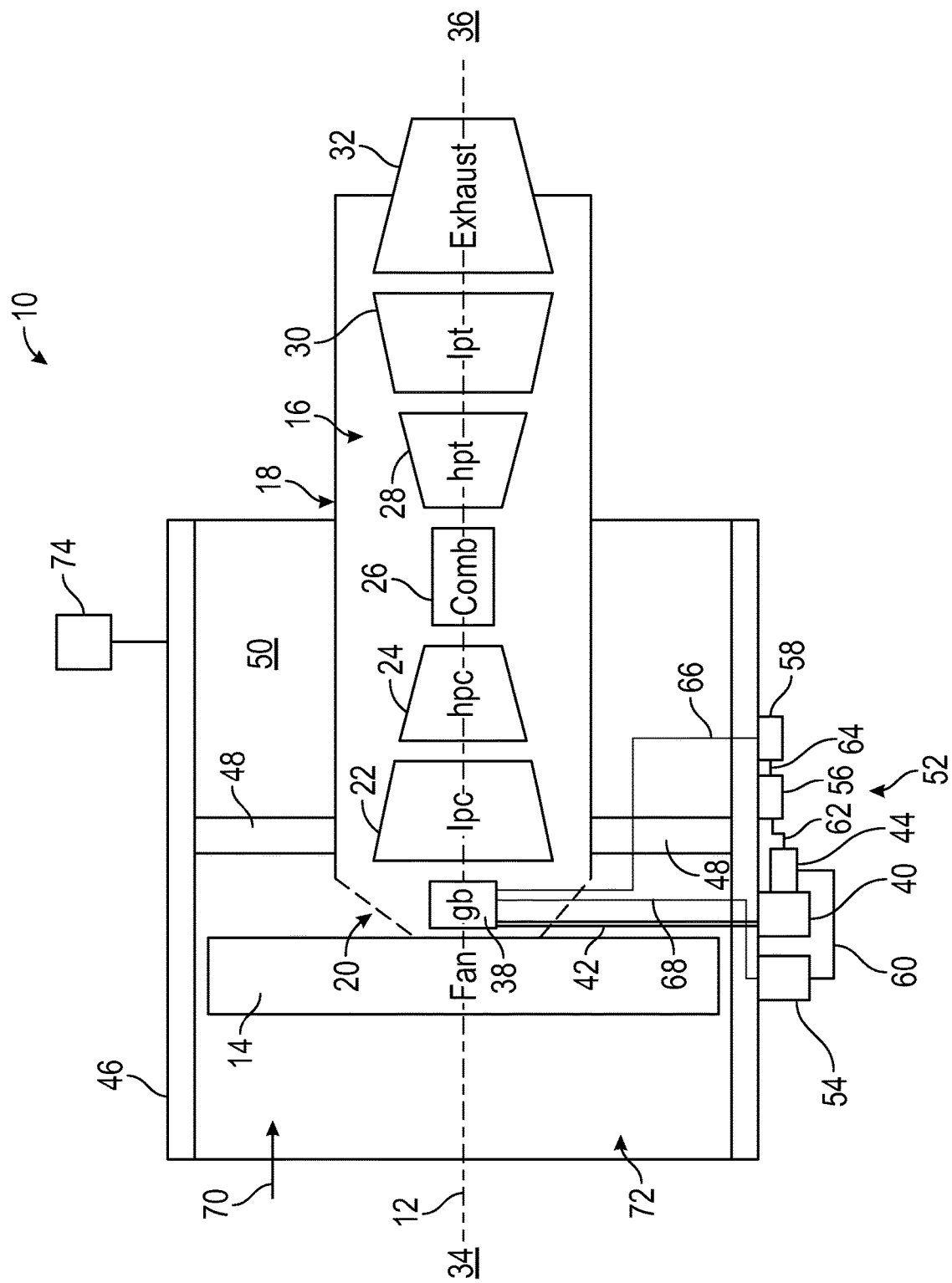
FIG. 1 is a schematic side view of an exemplary high by-pass turbofan jet engine, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" or "second" may be used interchangeably to distinguish one component from another and are not intended to signify location or importance of the individual components.

The terms "upstream" and "downstream" refer to the relative location within a system with respect to fluid flow in a fluid pathway. For example, "upstream" refers to a first location within the system from which the fluid flows to a second location within the system, and "downstream" refers to the location within the system to which the fluid flows after the fluid flows to the first location within the system.

Conventionally, aircraft engines include an oil delivery system that provides a flow of oil to various component parts of the aircraft engine. In an aircraft engine, the oil delivery system may deliver oil to a one or more gearboxes of the engine, or may provide oil to bearings of a compressor section, and to bearings of a turbine section. In an aircraft such as a helicopter, the oil delivery system may also provide a flow of oil to a main transmission that drives a main rotor assembly.

The oil delivery system may include an oil reservoir, a pump, a filter, and a heat exchanger, along with oil lines to provide a flow of oil from the oil reservoir to the main gearbox, and a return line to provide the flow of oil back to the oil reservoir. In some aircraft engines, if the oil delivery system fails, an emergency backup system may be activated to provide oil directly to the gearboxes and bearings without passing through the oil filter or the heat exchanger. This allows the oil flow to bypass elements within the oil delivery system that may be a source of leakage or blockage within the oil delivery system, including the heat exchanger, oil filter, or oil distribution lines of the oil delivery system. However, since the oil does not pass through the oil filter and heat exchanger elements, the oil may quickly become too hot and breakdown, thereby causing damage to the gearbox due to inadequate lubrication. In addition, the oil may become dirty quicker due to excess wear within the gearbox, which may cause the emergency system to fail.

The present disclosure addresses the foregoing by providing an oil delivery system that includes dual oil delivery circuits that are separately controlled based on a sensed pressure difference between the circuits. According to the present disclosure, a first oil circuit includes a first oil pump, a first switch valve, a first oil filter, and a first heat exchanger. A second oil circuit includes a second oil pump, a second switch valve, a second oil filter, and a second heat exchanger. Both the first switch valve and the second switch valve receive oil pressure feedback of both circuits, and control the flow of oil through their respective circuits based on a sensed oil pressure difference between the oil pressure in the first circuit and the oil pressure in the second circuit. As a result, when the oil pressure drops in one of the circuits due to, for example, a leak in that circuit, the switch valve in the circuit with the low oil pressure can take action to either divert the flow of oil through a return line back to an oil reservoir, or, as will be described below, the normally functioning oil circuit can switch from an upper suction port to a lower suction port within the oil reservoir. The foregoing dual oil system can therefore reliably provide filtered and cooled oil to the component parts of the engine. The dual systems may also allow for weight reduction by reducing the size of the oil reservoir and the amount of oil needed for proper functioning of the oil delivery system. Further, the dual systems can provide commonality between the component parts of each system.

Referring now to the drawings, FIG. 1 is a schematic side view of an exemplary high by-pass turbofan jet engine 10, herein referred to as "engine 10," as may incorporate various embodiments of the present disclosure. The engine 10 may be considered as one type of apparatus in which the oil delivery system of the present disclosure may be implemented. Although further described below with reference to a turbofan engine, the present disclosure is also applicable to turbomachinery in general, including turbojet, turboprop, and turboshaft gas turbine engines, including marine and industrial turbine engines and auxiliary power units. In addition, the present disclosure may be implemented with transmission systems in general, including transmission systems in rotary wing aircraft. Thus, the transmission system may also be considered as an apparatus in which the oil delivery system of the present disclosure may be implemented.

As shown in FIG. 1, engine 10 has a longitudinal centerline axis 12 that extends therethrough from an upstream end 34 of the engine 10 to a downstream end 36 of the engine 10 for reference purposes. In general, engine 10 may include a fan assembly 14 and a core engine 16 disposed downstream from the fan assembly 14.

The core engine 16 may generally include a core engine outer casing 18 that defines an annular inlet 20. The core engine outer casing 18 encases, in serial flow relationship, a low pressure (LP) compressor 22, a high pressure (HP) compressor 24, a combustor 26, a high pressure (HP) turbine 28, a low pressure (LP) turbine 30, and a jet exhaust nozzle section 32. While not shown in FIG. 1, a high pressure (HP) spool shaft assembly drivingly connects the HP turbine 28 to the HP compressor 24, and a low pressure (LP) spool shaft assembly drivingly connects the LP turbine 30 to the LP compressor 22. A main gearbox 38 is connected to the low pressure (LP) compressor 22 and is also connected to the fan assembly 14. The main gearbox 38 may be a reduction gearbox, such as a planetary gear system, that drives the fan assembly 14. The main gearbox 38 may also be connected to an accessory gearbox 40 via an accessory drive shaft assembly 42 so as to drive the accessory gearbox 40. The accessory gearbox 40 may include various accessories connected thereto, including at least one oil pump 44.

As shown in FIG. 1, a fan casing 46 circumferentially surrounds the fan assembly 14 and/or at least a portion of the core engine 16, and the fan casing 46 may be supported relative to the core engine 16 by a plurality of circumferentially spaced outlet guide vanes or struts 48 (only two shown in FIG. 1). In addition, at least a portion of the fan casing 46 may extend over an outer portion of the core engine 16 so as to define a bypass airflow passage 50 therebetween.

Various component parts of an oil delivery system 52 may be connected to the fan casing 46, including but not limited to an oil reservoir 54, an oil filter 56, and an oil system heat exchanger 58. The oil system heat exchanger 58 may include a cooling element, such as a fan (described below) for providing an airflow through the oil system heat exchanger 58. The oil delivery system 52 may also include various oil lines 60, 62, 64, 66, and 68 that provide a flow of oil through the oil delivery system 52, and that provide a flow of oil to the main gearbox 38. The foregoing is merely one example of an oil delivery system 52 and various architectures of the oil delivery system 52 will be described in more detail below.

In operation of the engine 10, air 70 (depicted schematically by an arrow) enters an inlet 72 of the engine 10, and a portion of the air 70 enters the core engine 16 via the annular inlet 20, where it is compressed by the LP compressor 22 and the HP compressor 24 to provide compressed air to the combustor 26. In the combustor 26, fuel is mixed with the compressed air, and the fuel and air mixture is ignited and burned to generate combustion product gases. The combustion product gases then flow through the HP turbine 28, thereby supporting operation of the HP compressor 24, and through the LP turbine 30, thereby supporting operation of the LP compressor 22. Finally, the combustion product gases are exhausted through the jet exhaust nozzle section 32. Another portion of the air 70 is propelled by the fan assembly 14 and enters the bypass airflow passage 50 so as to provide thrust.

Operation of the engine 10 may be controlled in whole or in part by an electronic engine controller 74, shown schematically in FIG. 1. One example of such an engine controller 74 is a full authority digital engine control ("FADEC"). The engine controller 74 may be mounted in any convenient location or in the engine 10, including, but not limited to, the fan casing 46, or within the core engine 16.

Figure 2:
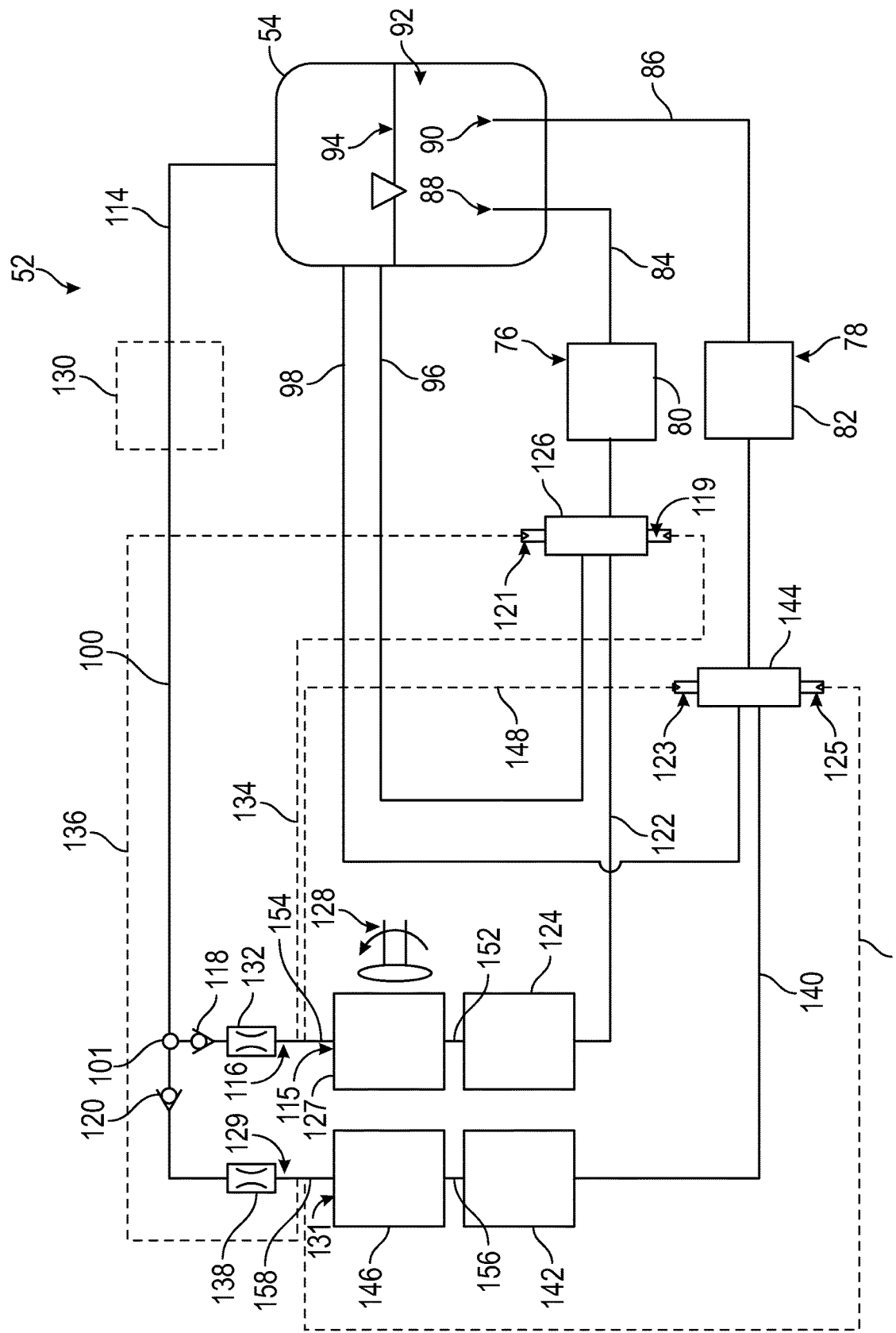
FIG. 2 is a schematic diagram of an exemplary architecture for an oil delivery system according to an aspect of the present disclosure.

FIG. 2 is a schematic diagram of an exemplary architecture for an oil delivery system 52 according to an aspect of the present disclosure. The architecture for the oil delivery system 52 in FIG. 2 is a dual oil delivery system that includes a first oil delivery circuit 76 and a second oil delivery circuit 78. The first oil delivery circuit 76 and the second oil delivery circuit 78 share a common oil supply via the oil reservoir 54. The first oil delivery circuit 76 may include a first oil pump 80 that receives a flow of oil 92 from the oil reservoir 54 via a first suction line 84. The first suction line 84 may include a first suction port 88 that is arranged below an oil level 94 of the oil 92 within the oil reservoir 54. Similarly, the second oil delivery circuit 78 may include a second oil pump 82 that receives a flow of the oil 92 from the oil reservoir 54 via a second suction line 86. The second suction line 86 may include a second suction port 90 that is arranged below the oil level 94 of the oil 92 in the oil reservoir 54. The first oil delivery circuit 76 may also include a first bypass return line 96 that, as will be described below, provides a bypass flow of the oil 92 that does not flow through various first circuit component parts of the first oil delivery circuit 76 downstream of the first oil pump 80, but instead, returns the flow of the oil 92 to the oil reservoir 54. Similarly, the second oil delivery circuit 78 may include a second bypass return line 98 that likewise provides a bypass flow of the oil 92 that does not flow through various second circuit component parts of the second oil delivery circuit 78 downstream of the second oil pump 82, but instead, returns the flow of the oil 92 to the oil reservoir 54. In addition, both the first oil delivery circuit 76 and the second oil delivery circuit 78 may be connected to the common oil distribution line 100 that provides the flow of the oil 92 to engine component parts 130 of the engine 10, and then a return line 114 returns the flow of the oil 92 to the oil reservoir 54.

Figure 3:
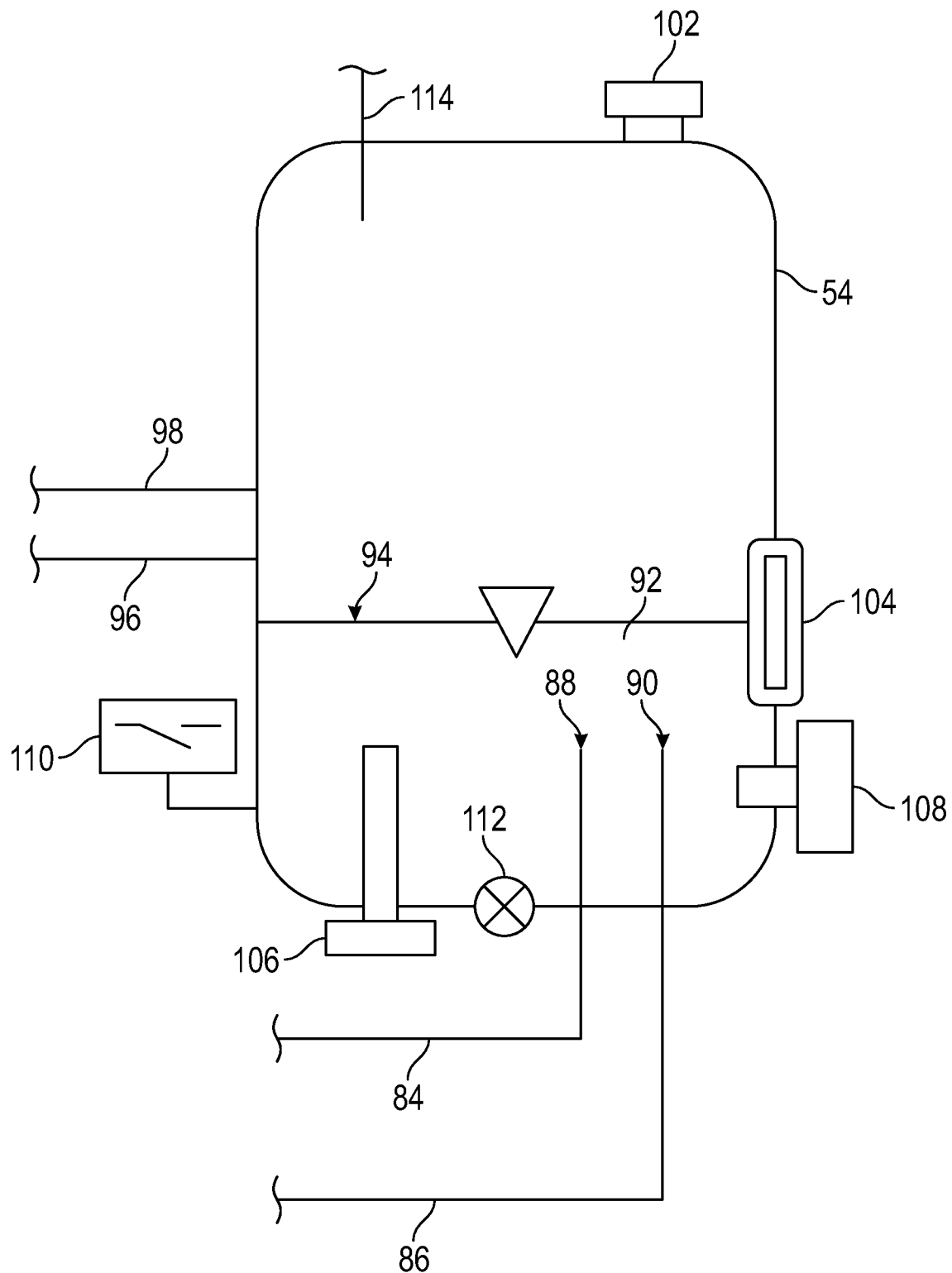
FIG. 3 is a schematic diagram depicting detailed components of an oil reservoir, according to an aspect of the present disclosure.

FIG. 3 is a schematic diagram depicting various elements of the oil reservoir 54, according to an aspect of the present disclosure. As shown in FIG. 3, the oil reservoir 54 may include a filler cap 102 for filling the oil reservoir with the oil 92, and a sight glass 104 for ground personnel to visually confirm the oil level 94 within the oil reservoir 54. The oil reservoir 54 may also include various sensors, including an oil level sensor 106, an oil temperature transducer 108, an oil temperature switch 110, and an electromagnetic chip detector 112.

Referring back to FIG. 2, the first oil delivery circuit 76 includes a first oil distribution line 122 that is connected to the first oil pump 80 and that delivers the oil 92 to at least one first circuit component part downstream of the first oil pump 80. As shown in FIG. 2, the first oil distribution line 122 is connected to a first oil filter element 124 downstream of the first oil pump 80 so as to deliver the oil 92 from the first oil pump 80 to the first oil filter element 124. The first oil filter element 124 may be one example of the at least one first circuit component part. The first oil delivery circuit 76 further includes a first heat exchanger element 127 that is connected downstream of the first oil filter element 124 via a distribution line 152. The first heat exchanger element 127 may also be considered as at least one first circuit component part. The first heat exchanger element 127 may be provided with a cooling airflow by a fan element 128. Further elements that may normally be included within an oil delivery circuit may also be included in the first oil delivery circuit 76, and the first oil filter element 124 and the first heat exchanger element 127 are merely examples of some first circuit component parts that may be included in the first oil delivery circuit 76.

A first switch valve 126 is provided downstream of the first oil pump 80 and is connected to the first oil distribution line 122. As will be described below, the first switch valve 126 receives oil pressure feedback of an oil pressure of the first oil delivery circuit 76 and of an oil pressure of the second oil delivery circuit 78, and, based on a pressure difference between the oil pressure of the first oil delivery circuit 76 and the second oil delivery circuit 78, controls a flow of the oil 92 to either flow through the first oil distribution line 122 and downstream to the first oil filter element 124, or to flow through the first bypass return line 96 to return to the oil reservoir 54.

The first oil delivery circuit 76 also includes a first restrictor 132 connected downstream of the first heat exchanger element 127 via a distribution line 154. The first restrictor 132 provides a restriction of the flow of oil 92 downstream of the first circuit component parts (i.e., downstream of the first oil filter element 124 and the first heat exchanger element 127) in the first oil delivery circuit 76, and upstream of a common oil distribution line junction 101, where the first oil delivery circuit 76 is joined to the common oil distribution line 100. A first oil pressure output line 134 is connected to the distribution line 154 between a downstream side 115 of the first heat exchanger element 127 and an upstream side 116 of the first restrictor 132 to provide first oil pressure feedback $PF_1$ to the first switch valve 126. The first oil pressure output line 134 may be an oil distribution line in which oil flows therethrough to an input connection 119 of the first switch valve 126. The flow of oil 92 through the first oil pressure output line 134 is pressurized at a first oil pressure $P_1$ of the first oil delivery circuit 76 taken downstream of the first heat exchanger element 127 and upstream of the first restrictor 132. The first oil pressure output line 134 is located downstream of the first oil filter element 124 and the first heat exchanger element 127 so that, in the event of a failure (e.g., a leak) in either of the first oil filter element 124 and/or the first heat exchanger element 127, a drop in the oil pressure caused by the failure can be detected by the first switch valve 126. Thus, the first oil pressure $P_1$ is sensed by the first switch valve 126 via the first oil pressure feedback $PF_1$. In this case, the "oil pressure feedback" may be considered to be the first oil pressure $P_1$ in the first oil delivery circuit 76 provided via the first oil pressure output line 134 to the first switch valve 126. As will be described below, the first switch valve 126 also receives second oil pressure feedback $PF_2$ of a second oil pressure P2 in the second oil delivery circuit 78 via a second oil pressure output line 136. Based on a pressure difference between the first oil pressure $P_1$ and the second oil pressure $P_2$, the first switch valve 126 controls the flow of the oil 92 through the first oil delivery circuit 76.

Alternatively, the first oil pressure output line 134 may be an electrical communication line that may be connected to an oil transducer element (not shown) attached to the distribution line 154 between the downstream side 115 of the first heat exchanger element 127 and the upstream side 116 of the first restrictor 132, so as to provide an electrical signal regarding the first oil pressure feedback $PF_1$ to the input connection 119 of the first switch valve 126. Thus, in this case, the electrical signal provided by the oil pressure transducer may be considered as the "oil pressure feedback."

The first oil delivery circuit 76 also includes a fourth oil pressure output line 148 that is also connected between the downstream side 115 of the first heat exchanger element 127 and the upstream side 116 of the first restrictor 132. As will be described below, the fourth oil pressure output line 148 provides fourth oil pressure feedback $PF_4$ of the first oil pressure $P_1$ in the first oil delivery circuit 76 to an input connection 123 of a second switch valve 144 in the second oil delivery circuit 78. The fourth oil pressure output line 148 may be similar to the first oil pressure output line 134 in that the fourth oil pressure output line 148 may be an oil distribution line or may be an electrical communication line connected with the oil transducer (not shown) between the downstream side 115 of the first heat exchanger element 127 and the upstream side 116 of the first restrictor 132.

Continuing with the first oil delivery circuit 76 of FIG. 2, a first check valve 118 is connected downstream of the first restrictor 132, and the first check valve 118 may be connected to the common oil distribution line 100 via the common oil distribution line junction 101. The common oil distribution line 100 may provide a flow of the oil 92 to the engine component parts 130, and the oil 92 may then be provided from the engine component parts 130 back to the oil reservoir 54 via the return line 114. The location of the first check valve 118 downstream of the first restrictor 132 allows for a proper functioning of the first oil delivery circuit 76 and prevents a back flow of the oil 92 into the first oil delivery circuit 76 in the event of a failure in any of the first circuit component parts within the first oil delivery circuit 76.

Continuing with FIG. 2, the second oil delivery circuit 78 is similar to the first oil delivery circuit 76 such that the oil delivery system 52 includes dual oil delivery circuits. Thus, similar to the first oil delivery circuit 76, the second oil delivery circuit 78 includes the second suction line 86 connected between the oil reservoir 54 and the second oil pump 82. A second oil distribution line 140 is connected to the second oil pump 82 and delivers the oil 92 to at least one second circuit component part (described below) downstream of the second oil pump 82.

As shown in FIG. 2, the second oil distribution line 140 is connected to a second oil filter element 142 downstream of the second oil pump 82 so as to deliver the oil 92 from the second oil pump 82 to the second oil filter element 142. The second oil filter element 142 may be one example of the at least one second circuit component part. The second oil delivery circuit 78 further includes a second heat exchanger element 146 that is connected downstream of the second oil filter element 142 via a distribution line 156. The second heat exchanger element 146 may also be considered to be at least one second circuit component part. The second heat exchanger element 146 may utilize the same cooling airflow provided by the fan element 128, such that the fan element 128 may be implemented to cool both the first heat exchanger element 127 and the second heat exchanger element 146. Alternatively, the first heat exchanger element 127 and the second heat exchanger element 146 may have their own fan element.

The second switch valve 144 is connected to the second oil distribution line 140 downstream of the second oil pump 82. As will be described below, similar to the first switch valve 126, the second switch valve 144 controls a flow of the oil 92 to either flow through the second oil distribution line 140 to the at least one second circuit component part (i.e., to the second oil filter element 142 and to the second heat exchanger element 146), or to flow through the second bypass return line 98 instead to return to the oil to the oil reservoir 54.

The second oil delivery circuit 78 also includes a second restrictor 138 connected downstream of the second heat exchanger element 146 via a distribution line 158. The second restrictor 138 provides a restriction of the flow of oil 92 at the downstream side of the second oil delivery circuit 78. The second oil pressure output line 136 is connected between a downstream side 131 of the second heat exchanger element 146 and an upstream side 129 of the second restrictor 138. As discussed above, the second oil pressure output line 136 provides the second oil pressure feedback $PF_2$ of the second oil pressure $P_2$ in the second oil delivery circuit 78 downstream of the at least one second circuit component part to the first switch valve 126 in the first oil delivery circuit 76. A third oil pressure output line 150 is also connected between the downstream side 131 of the second heat exchanger element 146 and the upstream side 129 of the second restrictor 138. The third oil pressure output line 150 provides a third oil pressure feedback $PF_3$ of the second oil pressure $P_2$ in the second oil delivery circuit 78 downstream of the at least one second circuit component part to the second switch valve 144. The third oil pressure output line 150 may be similar to each of the first oil pressure output line 134, the second oil pressure output line 136, and the fourth oil pressure output line 148 in that the third oil pressure output line 150 may be an oil distribution line in which oil flows therethrough to an input connection 125 of the second switch valve 144. Alternatively, the third oil pressure output line 150 may be an electrical communication line that may be connected to an oil transducer element (not shown) attached to the distribution line 158 between the downstream side 131 of the second heat exchanger element 146 and the upstream side 129 of the second restrictor 138, so as to provide an electrical signal regarding the third oil pressure feedback $PF_3$ to the input connection 125 of the second switch valve 144.

A second check valve 120 is connected downstream of the second restrictor 138, and the second check valve 120 may be connected to the common oil distribution line junction 101. The location of the second check valve 120 downstream of the second restrictor 138 also allows for a proper functioning of the second oil delivery circuit 78 and prevents a back flow of the oil 92 into the second oil delivery circuit 78 in the event of a failure of any of the second circuit component parts within the second oil delivery circuit 78.

Figure 4:
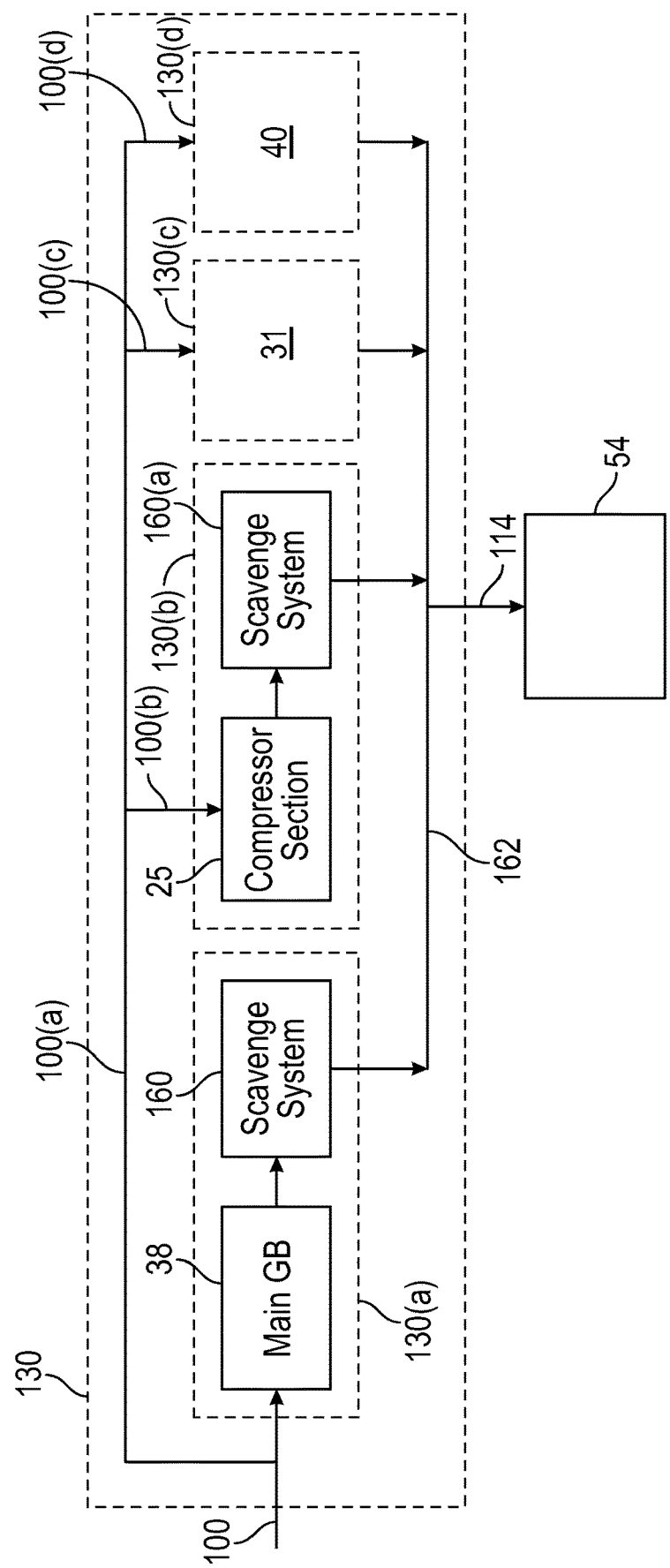
FIG. 4 is a schematic diagram depicting an example of an oil flow path through engine component parts, according to an aspect of the present disclosure.

FIG. 4 is a schematic diagram depicting an example of an oil flowpath through the engine component parts 130, according to an aspect of the present disclosure. In FIG. 4, common elements with those shown in FIG. 2 are labeled with the same reference numbers. As shown in FIG. 4, the engine component parts 130 (which may also be referred to as "apparatus component parts") may include, for example, an engine component part 130(a) that includes the main gearbox 38, where the common oil distribution line 100 is connected to the main gearbox 38. The engine component parts 130 may also include, for example, an engine component part 130(b), which may be a compressor section 25 that corresponds to the LP compressor 22 and the HP compressor 24 (FIG. 1). Thus, the common oil distribution line 100 may include a branch distribution line 100(a) and a branch distribution line 100(b) that provides a flow of the oil 92 to the compressor section 25. Further engine component parts 130 may include an engine component part 130(b), which may be a turbine section 31 that may include the HP turbine 28 and the LP turbine 30, and an engine component part 130(d), such as the accessory gearbox 40. A branch distribution line 100(c) may be connected with the branch distribution line 100(a) to provide a flow of the oil 92 to the engine component part 130(c), and a branch distribution line 100(d) may be connected with the branch distribution line 100(a) to provide a flow of the oil 92 to the engine component part 130(d).

The engine component parts 130 may also include a scavenge system for collecting the oil 92 and providing the oil 92 back to the return line 114. For example, in the engine component part 130(a), the main gearbox may include a scavenge system 160 connected with the main gearbox 38. Although not shown in FIG. 4, the scavenge system 160 may include, for example, a scavenge chip detector, a scavenge filter, and a scavenge pump that provides a pressurized flow of the oil 92 from the scavenge system 160 of the main gearbox 38 to a return line 162 and then to the return line 114 so as to continue the flow of the oil 92 back to the oil reservoir 54. A similar scavenge system 160(a) may be provided in the engine component part 130(b). Alternatively, rather than including a scavenge system having a scavenge filter and a scavenge pump such as in the scavenge system 160, the oil 92 may simply be provided to the return line 162 via a gravity feed from the engine component parts 130 to the return line 162. While FIG. 4 depicts engine component parts 130 of the gas turbine engine 10, the engine component parts 130 may constitute, for example, a transmission system of a rotary wing aircraft. Such a system may be similar to the engine component part 130(a) and include, for example, a gearbox and scavenge system similar to the main gearbox 38 and the scavenge system 160.

Returning to FIG. 2, in operation, upon startup of the engine 10, the accessory gearbox 40 (FIG. 1) operates to turn the first oil pump 80 and the second oil pump 82. The first oil pump 80 suctions the oil 92 via the first suction port 88 and the first suction line 84 to begin the flow of the oil 92 through the first oil delivery circuit 76. Similarly, the second oil pump 82 suctions the oil 92 via the second suction port 90 and the second suction line 86 to begin the flow of the oil 92 through the second oil delivery circuit 78.

In the first oil delivery circuit 76, the first switch valve 126 is initially set to a rest position to permit the flow of the oil 92 to flow through the first oil distribution line 122. In the first oil delivery circuit 76, the oil 92 then flows through the first oil filter element 124, through the distribution line 152, through the first heat exchanger element 127, through the first restrictor 132, through the first check valve 118, through the common oil distribution line 100, through the engine component parts 130, and through the return line 114 back to the oil reservoir 54. Similarly, in the second oil delivery circuit 78, the second switch valve 144 is initially set to a rest position to permit the flow of the oil 92 through the second oil distribution line 140. In the second oil delivery circuit 78, the oil 92 flows through the second oil filter element 142, through the distribution line 156, through the second heat exchanger element 146, through the second restrictor 138, through the second check valve 120, through the common oil distribution line 100, through the engine component parts 130, and through the return line 114 back to the oil reservoir 54.

For operation of the first oil delivery circuit 76, the first oil pressure output line 134 provides the first oil pressure feedback $PF_1$ to the input connection 119 of the first switch valve 126, and the fourth oil pressure output line 148 provides the fourth oil pressure feedback $PF_4$ to the input connection 123 of second switch valve 144. Similarly, the second oil pressure output line 136 provides the second oil pressure feedback $PF_2$ to the input connection 121 of the first switch valve 126, and the third oil pressure output line 150 provides the third oil pressure feedback $PF_3$ to the input connection 125 of the second switch valve 144.

In the first switch valve 126, while the first switch valve 126 is initially set in the rest position to permit the flow of oil 92 to flow to the first oil distribution line 122, once the first oil pump 80 starts providing the flow of the oil 92 through the first oil delivery circuit 76, and the second oil pump 82 starts providing the flow of the oil 92 through the second oil delivery circuit 78, whether the first switch valve 126 is then set to allow the oil 92 to continue to flow through the first oil distribution line 122, or is switched to be set to divert the flow of the oil 92 to flow through the first bypass return line 96 instead, is based on a first sensed oil pressure difference $\Delta P_{1-2}$ between the first oil pressure $P_1$, corresponding to the first oil pressure feedback $PF_1$ received at the input connection 119, and the second oil pressure $P_2$, corresponding to the second oil pressure feedback $PF_2$ received at the input connection 121. For example, in a case when the second oil pressure feedback $PF_2$ at the input connection 121 and the first oil pressure feedback $PF_1$ at the input connection 119 are relatively equal or within a predetermined threshold of being equal with one another, the first switch valve 126 is set to permit the flow of the oil 92 through the first oil distribution line 122. Additionally, in a case when the second oil pressure feedback $PF_2$ at the input connection 121 from the second oil delivery circuit 78 indicates a low second oil pressure $P_2$ within the second oil delivery circuit 78, but the first oil pressure feedback $PF_1$ at the input connection 119 indicates a normal first oil pressure $P_1$ for the first oil delivery circuit 76, the first switch valve 126 senses a positive pressure difference in that the first oil pressure $P_1$ in the first oil delivery circuit 76 is greater than the second oil pressure $P_2$ in the second oil delivery circuit 78. Thus, the first oil delivery circuit 76 is set to permit the flow of the oil 92 to continue to flow through the first oil distribution line 122. Thus, when a positive pressure difference between the two oil delivery circuits 76, 78 is present, the first oil delivery circuit 76 can continue normal operations, even though a failure may have occurred within the second oil delivery circuit 78 as indicated by the low second oil pressure $P_2$.

On the other hand, in a case when the second oil pressure feedback $PF_2$ at the input connection 121 from the second oil delivery circuit 78 indicates a normal second oil pressure $P_2$ within the second oil delivery circuit 78, but the first oil pressure feedback $PF_1$ at the input connection 119 indicates a low first oil pressure $P_1$, the first switch valve 126 senses the first sensed oil pressure difference $\Delta P_{1-2}$ as a negative pressure difference. When the first sensed oil pressure difference $\Delta P_{1-2}$ exceeds the negative threshold difference between the first oil pressure $P_1$ compared to the second oil pressure $P_2$, indicating a failure within the first oil delivery circuit 76, the first switch valve 126 is set to stop the flow of the oil 92 from flowing through the first oil distribution line 122 and to instead, permit the flow of the oil 92 to flow through the first bypass return line 96. The negative threshold difference may be, for example, a given percentage negative pressure difference between the two oil pressures, such as a negative pressure difference of greater than twenty-five percent, or greater than fifty percent, as but a couple examples. Alternatively, as will be described below, the threshold may be a negative pressure difference in the two oil pressures sufficient to overcome a spring force of a poppet valve within the first switch valve 126.

As one example of the foregoing operation, the first switch valve 126 may be a spring/poppet-type valve, where the first switch valve 126 includes a valve poppet (not shown), and a spring (not shown) on the first oil pressure $P_1$ side (at the input connection 119 receiving the first oil pressure feedback $PF_1$, where $PF_1=P_1$). The spring is set so that a corresponding spring force S on the valve poppet is less than the second oil pressure $P_2$ or the first oil pressure $P_1$ in normal operation. This allows the first switch valve 126 to be open when the engine 10 is in resting position. In other words, $P_1+S>P_2$, such that, at the engine resting position (when $P_1=0$, $P_2=0$, and $S>0$), the first switch valve 126 allows the oil 92 to flow to the first oil distribution line 122. If the second oil circuit fails (e.g., when $P_2<<P_1$, where $X<<Y$ means that the difference between X and Y exceeds a threshold amount and X is less than Y), then $P_1+S>P_2$ such that the first switch valve 126 continues to allow the oil 92 to flow through the first oil distribution line 122. On the other hand, if the first oil delivery circuit 76 fails (e.g., $P_1<<P_2$) and $P_1+S<P_2$, then the second oil pressure $P_2$ overcomes the first oil pressure $P_1$ and the spring force resistance so that the first switch valve 126 switches the poppet valve so as to not allow the oil 92 to flow through the first oil distribution line 122, but, instead, to divert the oil 92 to flow through the first bypass return line 96 instead.

Similarly, for operation of the second oil delivery circuit 78, in the second switch valve 144, whether the second switch valve 144 is set to allow the oil 92 to flow through the second oil distribution line 140 or is switched to be set to divert the flow of the oil 92 to flow through the second bypass return line 98 is based on a second sensed oil pressure difference $\Delta P_{3-4}$ between the third oil pressure feedback $PF_3$ received at the input connection 123 and the fourth oil pressure feedback $PF_4$ received at the input connection 125. For example, in a case when the fourth oil pressure feedback $PF_4$ at the input connection 125 and the third oil pressure feedback $PF_3$ at the input connection 123 are relatively equal or within the predetermined threshold of being equal with one another, the second switch valve 144 is set to permit to continue the flow of the oil 92 through the second oil distribution line 140.

Additionally, in a case when the third oil pressure feedback $PF_3$ at the input connection 123 from the first oil delivery circuit 76 indicates a low first oil pressure $P_1$ within the first oil delivery circuit 76, and the fourth oil pressure feedback $PF_4$ at the input connection 125 indicates a normal second oil pressure $P_2$ for the second oil delivery circuit 78 (i.e., when $P_1<<P_2$, or stated another way, $PF_4<<PF_3$), the second switch valve 144 senses a positive second oil pressure difference $\Delta P_{3-4}$, and the second switch valve 144 is set to permit to continue the flow of the oil 92 to flow through the second oil distribution line 140.

On the other hand, similar to the first switch valve 126, when the fourth oil pressure feedback $PF_4$ at the input connection 123 from the first oil delivery circuit 76 indicates a normal first oil pressure $P_1$ within the first oil delivery circuit 76, but the third oil pressure feedback $PF_3$ at the input connection 125 indicates a low second oil pressure $P_2$ in the second oil delivery circuit 78, a negative oil pressure difference $\Delta P_{3-4}$ is sensed. When the second sensed oil pressure difference $\Delta P_{3-4}$ exceeds the negative threshold (i.e., when $PF_3 \ll PF_4$ or stated another way, $P_2 \ll P_1$), indicating a failure within the second oil delivery circuit 78, the second switch valve 144 is set to stop the flow of the oil 92 from flowing through the second oil distribution line 140 and to instead, permit the flow of the oil 92 to flow through the return line 98.

The second switch valve 144 may also be a poppet/spring-type valve similar that of the first switch valve 126. Thus, for the second switch valve 144, in the resting position or in the normal operating condition, $P_2+S>P_1$ such that the second switch valve 144 continues to allow the oil 92 to flow through the second oil distribution line 140. On the other hand, if the second oil delivery circuit 78 fails (e.g., $P_2 \ll P_1$) and $P_2+S<P_1$, then the first oil pressure $P_1$ overcomes the second oil pressure $P_2$ and the spring resistance so that the second switch valve 144 switches the poppet valve so as to not allow the oil 92 to flow through the second oil distribution line 140, but, instead, to divert the oil 92 to flow through the second bypass return line 98 instead.

Thus, when the first oil delivery circuit 76 and the second oil delivery circuit 78 are both functioning normally, both the first switch valve 126 and the second switch valve 144 are set so that the first oil delivery circuit 76 and the second oil delivery circuit 78 can both provide the flow of the oil 92 to the engine component parts 130. Additionally, when the first switch valve 126 detects, based on the first sensed pressure difference $\Delta P_{1-2}$, that the first oil delivery circuit 76 is functioning normally, but the second oil delivery circuit 78 is not functioning normally due to low second oil pressure $P_2$, the first switch valve 126 is set to continue the normal operation and to provide the flow of the oil 92 to the engine component parts 130. In this case, the second switch valve 144 detects, based on the pressure difference $\Delta P_{3-4}$, that the second oil delivery circuit 78 is not functioning normally (i.e., has a low second oil pressure $P_2$) and switches so that the flow of oil 92 is not provided through the second oil distribution line 140, but is provided to the second bypass return line 98 instead.

Similarly, when the second switch valve 144 detects, based on the pressure difference $\Delta P_{3-4}$, that the second oil delivery circuit 78 is functioning normally, but the first oil delivery circuit 76 is not functioning normally due to low first oil pressure $P_1$, the second switch valve 144 is set to continue the normal operation and to provide the flow of the oil 92 to the engine component parts 130. In this case, the first switch valve 126 detects, based on the first sensed pressure difference $\Delta P_{1-2}$, that the first oil delivery circuit 76 is not functioning normally (i.e., has a low first oil pressure $P_1$) and switches delivery so that the flow of oil 92 is not provided through the first oil distribution line 122, but is provided to the first bypass return line 96 instead.

As a result, the dual oil delivery systems provide for a reliable flow of oil to the circuit component parts of a properly functioning oil delivery circuit to the engine components even if one of the oil delivery systems fails. In addition, because the flow of the oil 92 is continuously provided through the oil filters and the heat exchangers of both circuits until a failure is detected, both oil delivery systems are conditioned to provide a reliable delivery of the oil to the engine component parts once one of the oil delivery systems fails.

Figure 5:
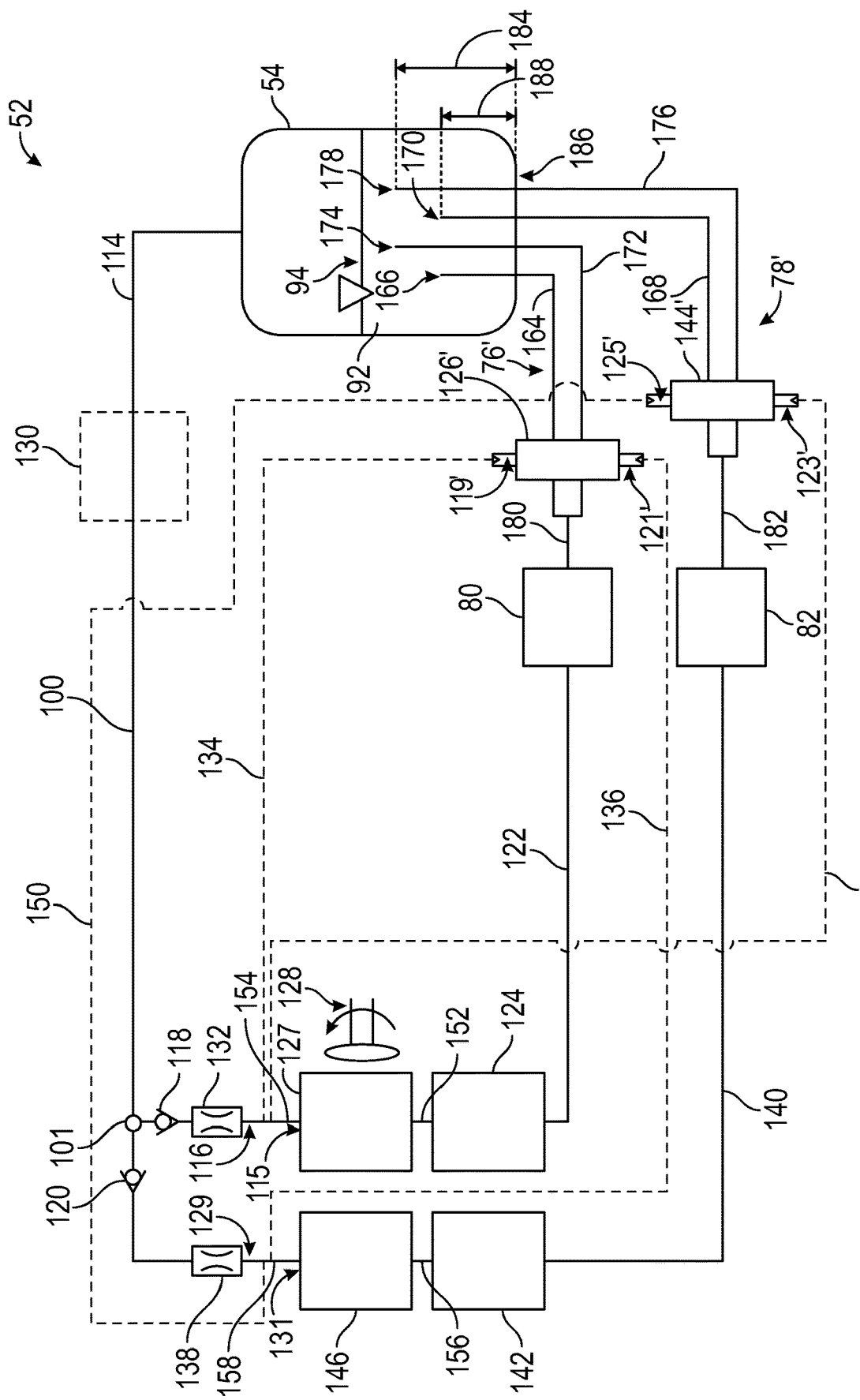
FIG. 5 is a schematic diagram of an exemplary architecture for an oil delivery system according to an alternate aspect of the present disclosure.

FIG. 5 is a schematic diagram of an exemplary architecture for an oil delivery system 52 according to an alternate aspect of the present disclosure. In FIG. 5, elements that are common with those depicted in the FIG. 2 aspect are shown with the same reference numerals as those shown in FIG. 2. Briefly, some differences between the FIG. 5 aspect and the FIG. 2 aspect are the locations of the switch valves in relation to the oil pumps, the omission of the bypass return lines, and the addition of a second suction line for each of the oil delivery circuits. In addition, in comparison to FIG. 2 in which the switch valves 126, 144 detect a low oil pressure in its own oil delivery circuit, the switch valves detect a low pressure in the other oil delivery circuit and perform the switching operations accordingly, in FIG. 5, the switch valves detect a low oil pressure in the other oil delivery circuit rather than its own oil delivery circuit, and perform switching operations accordingly.

In the FIG. 5 aspect, a first switch valve 126' is arranged between the oil reservoir 54 and the first oil pump 80, and a second switch valve 144' is arranged between the oil reservoir 54 and the second oil pump 82. The first switch valve 126' and the second switch valve 144' are discussed in more detail below. In comparison to the FIG. 2 aspect, in the FIG. 5 aspect, the first oil pump 80 is arranged downstream of the first switch valve 126' and is connected with the first switch valve 126' via a distribution line 180. Similarly, the second oil pump 82 is arranged downstream of the second switch valve 144' and is connected with the second switch valve 144' via a distribution line 182. Alternatively, the first switch valve 126' could be connected directly to the first oil pump 80 without the need for the distribution line 180. Similarly, the second switch valve 144' may be connected directly to the second oil pump 82 without the need for the distribution line 182.

The first oil delivery circuit 76' of FIG. 5 includes a first upper suction line 172 arranged between the oil reservoir 54 and the first switch valve 126', where the first upper suction line 172 includes a first upper suction port 174. The first upper suction port 174 may be arranged a first distance 184 from a bottom side 186 of the oil reservoir 54. In addition, the first oil delivery circuit 76' includes a first lower suction line 164 arranged between the oil reservoir 54 and the first switch valve 126', where the first lower suction line 164 includes a first lower suction port 166. The first lower suction port 166 may be arranged a second distance 188 from the bottom side 186 of the oil reservoir 54, where the second distance 188 is less than the first distance 184.

Similarly, in the second oil delivery circuit 78', a second upper suction line 176 is arranged between the oil reservoir 54 and the second switch valve 144', where the second upper suction line 176 includes a second upper suction port 178. The second upper suction port 178 may be arranged at the same first distance 184 from the bottom side 186 of the oil reservoir 54 as the first upper suction port 174. The second oil delivery circuit 78' also includes a second lower suction line 168 arranged between the oil reservoir 54 and the second switch valve 144, where the second lower suction line 168 includes a second lower suction port 170. The second lower suction port 170 may be arranged at the same second distance 188 from the bottom side 186 of the oil reservoir 54 as the first lower suction port 166.

Similar to the FIG. 2 aspect, the first switch valve 126' receives the first oil pressure feedback $PF_1$ of the first oil pressure $P_1$ via the first oil pressure output line 134 at an input connection 119', and receives the second oil pressure feedback $PF_2$ of the second oil pressure $P_2$ via the second oil pressure output line 136 at an input connection 121'. The first switch valve 126' senses the first sensed pressure difference $\Delta P_{1-2}$ and controls the first switch valve 126' accordingly. More specifically, under normal operating conditions and in the rest position, the first switch valve 126' is set to permit the flow of oil 92 to be suctioned from first upper suction line 172 and the first upper suction port 174, and to close off the first lower suction line 164. On the other hand, when, for example, the first sensed pressure difference $\Delta P_{1-2}$ in the first switch valve 126' indicates that a failure has occurred in the second oil delivery circuit 78' (e.g., $P_2 \ll P_1$), the first switch valve 126' that is operating to suction oil from the oil reservoir 54 via the first upper suction port 174, can switch from the first upper suction line 172 to the first lower suction line 164. As a result, the first oil delivery circuit 76' can continue to operate normally. As for the second oil delivery circuit 78', the second switch valve 144' receives the third oil pressure feedback $PF_3$ of the second oil pressure $P_2$ via the third oil pressure output line 150 at an input connection 125' and receives the fourth oil pressure feedback $PF_4$ of the first oil pressure $P_1$ via the fourth oil pressure output line 148 at an input connection 153'. In the same case where the failure has occurred in the second oil delivery circuit 78' (i.e., $P_2 \ll P_1$), the second switch valve 144', which is initially operating to suction oil from the second upper suction line 176 does not switch to the second lower suction line 168, but continues operation with the second upper suction line 176. As a result, once the oil level 94 within the oil reservoir 54 drops below the level of the second upper suction port 178 due to the failure (e.g., leak) within the second oil delivery circuit 78', the second oil delivery circuit 78' in which the failure has occurred will no longer circulate oil therethrough and the second oil pump 82 may be shut down, while the first oil delivery circuit 76' will continue normal operation via the switching by the first switch valve 126' to the first lower suction line 164.

Similarly, in a case where a leak occurs within the first oil delivery circuit 76', the second switch valve 144' receives the third oil pressure feedback $PF_3$ of the second oil pressure $P_2$ via the third oil pressure output line 150, and receives the fourth oil pressure feedback $PF_4$ of the first oil pressure $P_1$ via the fourth oil pressure output line 148. The second switch valve 144' senses the second sensed pressure difference $\Delta P_{3-4}$ and controls the second switch valve 144 accordingly. More specifically, under normal operating conditions and in the rest position, the second switch valve 144' is set to permit the flow of oil 92 to be suctioned from second upper suction line 176 and the second upper suction port 178, and to close off the second lower suction line 168. On the other hand, when, for example, the second pressure difference $\Delta P_{3-4}$ in the second switch valve 144' indicates that a failure has occurred in the first oil delivery circuit 76' (e.g., $P_1 \ll P_2$), the second switch valve 144' that is operating to suction oil from the oil reservoir 54 via the second upper suction port 178, can switch from the second upper suction line 178 to the second lower suction line 168. As a result, the second oil delivery circuit 78' can continue to operate normally. As for the first oil delivery circuit 76', in the same case where the failure has occurred in the first oil delivery circuit 76' (i.e., $P_1 \ll P_2$), the first switch valve 126', which is initially operating to suction oil from the first upper suction line 172 does not switch to the first lower suction line 164, but continues operation with the first upper suction line 172. As a result, once the oil level 94 within the oil reservoir 54 drops below the level of the first upper suction port 174 due to the failure within the first oil delivery circuit 76', the first oil delivery circuit 76' in which the failure has occurred will no longer circulate oil therethrough and the first oil pump 80 may be shut down, while the second oil delivery circuit 78' will continue normal operation via the switching by the second switch valve 144' to the second lower suction line 168.

While the foregoing description relates generally to an oil delivery system in a gas turbine engine, the oil delivery system may be implemented in various other environments. For example, the oil delivery system may be implemented in transmission systems in general, including transmission systems in rotary wing aircraft. Moreover, the gas turbine engine implementation is not limited to gas turbine engines in aircraft and the gas turbine engine may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

An oil delivery system including an oil reservoir, a first oil delivery circuit connected with the oil reservoir, the first oil delivery circuit including (a) a first oil distribution line delivering oil to at least one first circuit component part, (b) a first oil pump, and (c) a first switch valve; and a second oil delivery circuit connected with the oil reservoir, the second oil delivery circuit including (i) a second oil distribution line delivering oil to at least one second circuit component part, (ii) a second oil pump, and (iii) a second switch valve, wherein the first switch valve is configured to: receive first oil pressure feedback, via a first oil pressure output line, of a first oil pressure in the first oil delivery circuit downstream of the at least one first circuit component part; receive second oil pressure feedback, via a second oil pressure output line, of a second oil pressure in the second oil delivery circuit downstream of the at least one second circuit component part; and control a flow of oil through the first oil delivery circuit based on a first sensed oil pressure difference between the first oil pressure and the second oil pressure; and wherein the second switch valve is configured to: receive a third oil pressure feedback, via a third oil pressure output line, of the second oil pressure in the second oil delivery circuit downstream of the at least one second circuit component part; receive a fourth oil pressure feedback, via a fourth oil pressure output line, of the first oil pressure in the first oil delivery circuit downstream of the at least one first circuit component part; and control a flow of oil through the second oil delivery circuit based on a second sensed oil pressure difference between the second oil pressure and the first oil pressure.

The oil delivery system according to the preceding clause, wherein the first oil delivery circuit further includes (e) a first bypass return line connected between the first switch valve and the oil reservoir, the first switch valve controlling the flow of oil through one of the first oil distribution line and the first bypass return line based on the first sensed oil pressure difference.

The oil delivery system according to any preceding clause, wherein the second oil delivery circuit further includes (v) a second bypass return line connected between the second switch valve and the oil reservoir, the second switch valve controlling the flow of oil through one of the second oil distribution line and the second bypass return line based on the second sensed oil pressure difference.

The oil delivery system according to any preceding clause, wherein the first switch valve is arranged downstream of the first oil pump, and the second switch valve is arranged downstream of the second oil pump.

The oil delivery system according to any preceding clause, wherein the first switch valve control the flow of oil to flow through the first bypass return line in a case when the first sensed oil pressure difference indicates a low first oil pressure in the first oil delivery circuit as compared to a second oil pressure in the second oil delivery circuit, and the second switch valve controls the flow of oil to flow through the second bypass return line in a case when the second sensed oil pressure difference indicates a low second oil pressure in the second oil delivery circuit as compared to the first oil pressure in the first oil delivery circuit.

The oil delivery system according to any preceding clause, wherein the first oil delivery circuit further includes (e) a first suction line connected to the oil reservoir and providing oil from the oil reservoir to the first oil delivery circuit, and the second oil delivery circuit further includes (v) a second suction line connected to the oil reservoir and providing oil from the oil reservoir to the second oil delivery circuit.

The oil delivery system according to any preceding clause, wherein the oil delivery system is installed in an apparatus, and the first oil delivery circuit and the second oil delivery circuit are connected to a common oil distribution line providing a flow of oil to at least one component part of the apparatus.

The oil delivery system according to any preceding clause, wherein the apparatus is a gas turbine engine, and the at least one component part of the apparatus includes at least one of a main gearbox, a compressor section, a turbine section, and an accessory gearbox.

The oil delivery system according to any preceding clause, wherein the first oil delivery circuit further includes a first restrictor, the second oil delivery circuit further includes a second restrictor, the at least one first circuit component part comprises at least one of a first oil filter element and a first heat exchanger element, and the at least one second circuit component part comprises at least one of a second oil filter element and a second heat exchanger element.

The oil delivery system according to any preceding clause, wherein the first heat exchanger element and the second heat exchanger element share a common cooling element.

The oil delivery system according to any preceding clause, wherein the first oil delivery circuit includes a first check valve and the second oil delivery circuit includes a second check valve, the first restrictor is arranged downstream of the at least one first circuit component part, the first check valve is arranged downstream of the first restrictor, the second restrictor is arranged downstream of the at least one second circuit component part, and the second check valve is arranged downstream of the second restrictor.

The oil delivery system according to any preceding clause, wherein the first switch valve is arranged between the oil reservoir and the first oil pump, and the second switch valve is arranged between the oil reservoir and the second oil pump.

The oil delivery system according to any preceding clause, wherein the first oil delivery circuit further includes (e) a first upper suction line arranged between the oil reservoir and the first switch valve, and (f) a first lower suction line arranged between the oil reservoir and the first switch valve, the first switch valve controlling the flow of oil through the first oil delivery circuit by switching between the first upper suction line and the first lower suction line based on the first sensed oil pressure difference, and the second oil delivery circuit further includes (v) a second upper suction line arranged between the oil reservoir and the second switch valve, and (vi) a second lower suction line arranged between the oil reservoir and the second switch valve, the second switch valve controlling the flow of oil through the second oil delivery circuit by switching between the second upper suction line and the second lower suction line based on the second sensed oil pressure difference.

The oil delivery system according to any preceding clause, wherein the oil delivery system is installed in an apparatus, and the first oil delivery circuit and the second oil delivery circuit are connected to a common oil distribution line providing a flow of oil to at least one component part of the apparatus.

The oil delivery system according to any preceding clause, wherein the apparatus comprises any one of a gas turbine engine and a transmission of a rotary-wing aircraft.

A gas turbine engine including at least one engine component part receiving oil lubrication; and an oil delivery system providing a flow of oil to the at least one engine component part, the oil delivery system including an oil reservoir, a first oil delivery circuit connected with the oil reservoir, the first oil delivery circuit including (a) a first oil distribution line delivering oil to the at least one first circuit component part, (b) a first oil pump, and (c) a first switch valve, and a second oil delivery circuit connected with the oil reservoir, the second oil delivery circuit including (i) a second oil distribution line delivering oil to the at least one second circuit component part, (ii) a second oil pump, and (iii) a second switch valve, wherein the first switch valve is configured to receive first oil pressure feedback, via a first oil pressure output line, of a first oil pressure in the first oil delivery circuit downstream of the at least one first circuit component part, receive second oil pressure feedback, via a second oil pressure output line, of a second oil pressure in the second oil delivery circuit downstream of the at least one second circuit component part, and control a flow of oil through the first oil delivery circuit based on a first sensed oil pressure difference between the first oil pressure and the second oil pressure, and wherein the second switch valve is configured to receive third oil pressure feedback, via a third oil pressure output line, of the second oil pressure in the second oil delivery system downstream of the at least one second circuit component part, receive fourth oil pressure feedback, via fourth oil pressure output line, of the first oil pressure in the first oil delivery system downstream of the at least one first circuit component part, and control a flow of oil through the second oil delivery circuit based on a second sensed oil pressure difference between the second oil pressure and the first oil pressure.

The gas turbine engine according to the preceding clause, wherein the first oil delivery circuit further includes (e) a first bypass return line connected between the first switch valve and the oil reservoir, the first switch valve controlling the flow of oil through one of the first oil distribution line and the first bypass return line based on the first sensed oil pressure difference, and the second oil delivery circuit further includes (v) a second bypass return line connected between the second switch valve and the oil reservoir, the second switch valve controlling the flow of oil through one of the second oil distribution line and the second bypass return line based on the second sensed oil pressure difference.

The gas turbine engine according to any preceding clause, wherein the first oil delivery circuit further includes (e) a first suction line connected to the oil reservoir and providing oil from the oil reservoir to the first oil delivery circuit, and the second oil delivery circuit further includes (v) a second suction line connected to the oil reservoir and providing oil from the oil reservoir to the second oil delivery circuit, and the first oil delivery circuit and the second oil delivery circuit are connected to a common oil distribution line providing a flow of oil to the at least one engine component part.

The gas turbine engine according to any preceding clause, wherein the first switch valve is arranged between the oil reservoir and the first oil pump, and the second switch valve is arranged between the oil reservoir and the second oil pump, the first oil delivery circuit further includes (e) a first upper suction line arranged between the oil reservoir and the first switch valve, and (f) a first lower suction line arranged between the oil reservoir and the first switch valve, the first switch valve configured to control the flow of oil through the first oil delivery circuit by switching between the first upper suction line and the first lower suction line based on the first sensed oil pressure difference, and the second oil delivery circuit further includes (v) a second upper suction line arranged between the oil reservoir and the second switch valve, and (vi) a second lower suction line arranged between the oil reservoir and the second switch valve, the second switch valve configured to control the flow of oil through the second oil delivery circuit by switching between the second upper suction line and the second lower suction line based on the second sensed oil pressure difference.

The gas turbine engine according to any preceding clause, wherein the at least one first circuit component part comprises a first oil filter element and a first heat exchanger element, and the at least one second circuit component part comprises a second oil filter element and a second heat exchanger element.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. An oil delivery system comprising:
   an oil reservoir;
   a first oil delivery circuit connected with the oil reservoir, the first oil delivery circuit including (a) a first oil distribution line delivering oil to at least one first circuit component part, (b) a first oil pump, and (c) a first switch valve; and
   a second oil delivery circuit connected with the oil reservoir, the second oil delivery circuit including (i) a second oil distribution line delivering oil to at least one second circuit component part, (ii) a second oil pump, and (iii) a second switch valve,
   wherein the first switch valve is configured to:
      receive first oil pressure feedback, via a first oil pressure output line, of a first oil pressure in the first oil delivery circuit downstream of the at least one first circuit component part;
      receive second oil pressure feedback, via a second oil pressure output line, of a second oil pressure in the second oil delivery circuit downstream of the at least one second circuit component part; and
      control a flow of oil through the first oil delivery circuit based on a first sensed oil pressure difference between the first oil pressure and the second oil pressure; and
   wherein the second switch valve is configured to:
      receive a third oil pressure feedback, via a third oil pressure output line, of the second oil pressure in the second oil delivery circuit downstream of the at least one second circuit component part;
      receive a fourth oil pressure feedback, via a fourth oil pressure output line, of the first oil pressure in the first oil delivery circuit downstream of the at least one first circuit component part; and
      control a flow of oil through the second oil delivery circuit based on a second sensed oil pressure difference between the second oil pressure and the first oil pressure.

2. The oil delivery system according to claim 1, wherein the first oil delivery circuit further includes (e) a first bypass return line connected between the first switch valve and the oil reservoir, the first switch valve controlling the flow of oil through one of the first oil distribution line and the first bypass return line based on the first sensed oil pressure difference.

3. The oil delivery system according to claim 2, wherein the second oil delivery circuit further includes (v) a second bypass return line connected between the second switch valve and the oil reservoir, the second switch valve controlling the flow of oil through one of the second oil distribution line and the second bypass return line based on the second sensed oil pressure difference.

4. The oil delivery system according to claim 3, wherein the first switch valve is arranged downstream of the first oil pump, and the second switch valve is arranged downstream of the second oil pump.

5. The oil delivery system according to claim 3, wherein the first switch valve controls the flow of oil to flow through the first bypass return line in a case when the first sensed oil pressure difference indicates a low first oil pressure in the first oil delivery circuit as compared to a second oil pressure in the second oil delivery circuit, and the second switch valve controls the flow of oil to flow through the second bypass return line in a case when the second sensed oil pressure difference indicates a low second oil pressure in the second oil delivery circuit as compared to the first oil pressure in the first oil delivery circuit.

6. The oil delivery system according to claim 1, wherein the first oil delivery circuit further includes (e) a first suction line connected to the oil reservoir and providing oil from the oil reservoir to the first oil delivery circuit, and the second oil delivery circuit further includes (v) a second suction line connected to the oil reservoir and providing oil from the oil reservoir to the second oil delivery circuit.

7. The oil delivery system according to claim 6, wherein the oil delivery system is installed in an apparatus, and the first oil delivery circuit and the second oil delivery circuit are connected to a common oil distribution line providing a flow of oil to at least one component part of the apparatus.

8. The oil delivery system according to claim 7, wherein the apparatus is a gas turbine engine, and the at least one component part of the apparatus includes at least one of a main gearbox, a compressor section, a turbine section, and an accessory gearbox.

9. The oil delivery system according to claim 1, wherein the first oil delivery circuit further includes a first restrictor, the second oil delivery circuit further includes a second restrictor, the at least one first circuit component part comprises at least one of a first oil filter element and a first heat exchanger element, and the at least one second circuit component part comprises at least one of a second oil filter element and a second heat exchanger element.

10. The oil delivery system according to claim 9, wherein the first heat exchanger element and the second heat exchanger element share a common cooling element.

11. The oil delivery system according to claim 9, wherein the first oil delivery circuit includes a first check valve and the second oil delivery circuit includes a second check valve, the first restrictor is arranged downstream of the at least one first circuit component part, the first check valve is arranged downstream of the first restrictor, the second restrictor is arranged downstream of the at least one second circuit component part, and the second check valve is arranged downstream of the second restrictor.

12. The oil delivery system according to claim 1, wherein the first switch valve is arranged between the oil reservoir and the first oil pump, and the second switch valve is arranged between the oil reservoir and the second oil pump.

13. The oil delivery system according to claim 12, wherein the first oil delivery circuit further includes (e) a first upper suction line arranged between the oil reservoir and the first switch valve, and (f) a first lower suction line arranged between the oil reservoir and the first switch valve, the first switch valve controlling the flow of oil through the first oil delivery circuit by switching between the first upper suction line and the first lower suction line based on the first sensed oil pressure difference, and the second oil delivery circuit further includes (v) a second upper suction line arranged between the oil reservoir and the second switch valve, and (vi) a second lower suction line arranged between the oil reservoir and the second switch valve, the second switch valve controlling the flow of oil through the second oil delivery circuit by switching between the second upper suction line and the second lower suction line based on the second sensed oil pressure difference.

14. The oil delivery system according to claim 13, wherein the oil delivery system is installed in an apparatus, and the first oil delivery circuit and the second oil delivery circuit are connected to a common oil distribution line providing a flow of oil to at least one component part of the apparatus.

15. The oil delivery system according to claim 14, wherein the apparatus comprises any one of a gas turbine engine and a transmission of a rotary-wing aircraft.

16. A gas turbine engine comprising:
at least one engine component part receiving oil lubrication; and
an oil delivery system providing a flow of oil to the at least one engine component part, the oil delivery system comprising:
an oil reservoir;
a first oil delivery circuit connected with the oil reservoir, the first oil delivery circuit including (a) a first oil distribution line delivering oil to at least one first circuit component part, (b) a first oil pump, and (c) a first switch valve; and
a second oil delivery circuit connected with the oil reservoir, the second oil delivery circuit including (i) a second oil distribution line delivering oil to at least one second circuit component part, (ii) a second oil pump, and (iii) a second switch valve,
wherein the first switch valve is configured to:
receive first oil pressure feedback, via a first oil pressure output line, of a first oil pressure in the first oil delivery circuit downstream of the at least one first circuit component part;
receive second oil pressure feedback, via a second oil pressure output line, of a second oil pressure in the second oil delivery circuit downstream of the at least one second circuit component part; and
control a flow of oil through the first oil delivery circuit based on a first sensed oil pressure difference between the first oil pressure and the second oil pressure; and
wherein the second switch valve is configured to:
receive third oil pressure feedback, via a third oil pressure output line, of the second oil pressure in the second oil delivery circuit downstream of the at least one second circuit component part;
receive fourth oil pressure feedback, via a fourth oil pressure output line, of the first oil pressure in the first oil delivery circuit downstream of the at least one first circuit component part; and
control a flow of oil through the second oil delivery circuit based on a second sensed oil pressure difference between the second oil pressure and the first oil pressure.

17. The gas turbine engine according to claim 16, wherein the first oil delivery circuit further includes (e) a first bypass return line connected between the first switch valve and the oil reservoir, the first switch valve controlling the flow of oil through one of the first oil distribution line and the first bypass return line based on the first sensed oil pressure difference, and the second oil delivery circuit further includes (v) a second bypass return line connected between the second switch valve and the oil reservoir, the second switch valve controlling the flow of oil through one of the second oil distribution line and the second bypass return line based on the second sensed oil pressure difference.

18. The gas turbine engine according to claim 16, wherein the first oil delivery circuit further includes (e) a first suction line connected to the oil reservoir and providing oil from the oil reservoir to the first oil delivery circuit, and the second oil delivery circuit further includes (v) a second suction line connected to the oil reservoir and providing oil from the oil reservoir to the second oil delivery circuit, and
the first oil delivery circuit and the second oil delivery circuit are connected to a common oil distribution line providing a flow of oil to the at least one engine component part.

19. The gas turbine engine according to claim 16, wherein the first switch valve is arranged between the oil reservoir and the first oil pump, and the second switch valve is arranged between the oil reservoir and the second oil pump,
the first oil delivery circuit further includes (e) a first upper suction line arranged between the oil reservoir and the first switch valve, and (f) a first lower suction line arranged between the oil reservoir and the first switch valve, the first switch valve configured to control the flow of oil through the first oil delivery circuit by switching between the first upper suction line and the first lower suction line based on the first sensed oil pressure difference, and
the second oil delivery circuit further includes (v) a second upper suction line arranged between the oil reservoir and the second switch valve, and (vi) a second lower suction line arranged between the oil reservoir and the second switch valve, the second switch valve configured to control the flow of oil through the second oil delivery circuit by switching between the second upper suction line and the second lower suction line based on the second sensed oil pressure difference.

20. The gas turbine engine according to claim 19, wherein the at least one first circuit component part comprises a first oil filter element and a first heat exchanger element, and the at least one second circuit component part comprises a second oil filter element and a second heat exchanger element.

\* \* \* \* \*